Jan. 15, 1935.　　　　J. W. HANSEN　　　　1,987,823
SELF STARTING SYNCHRONOUS ELECTRIC MOTOR
Filed Feb. 6, 1934
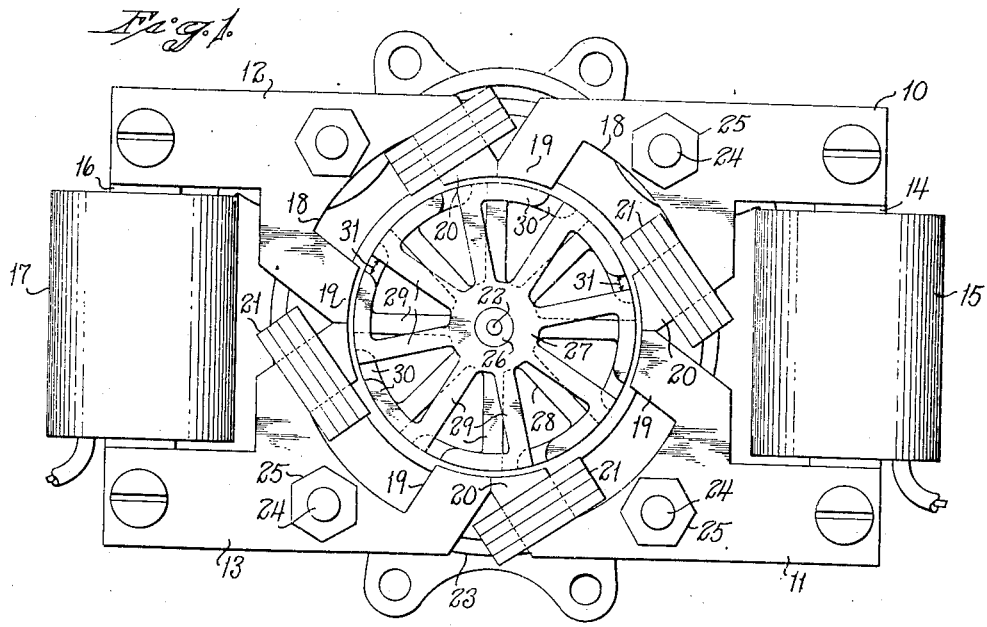
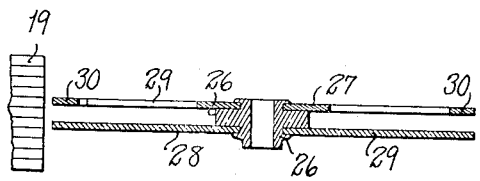
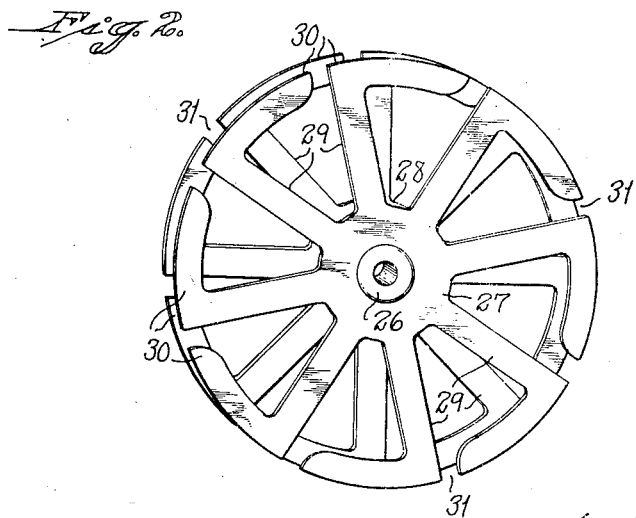

Patented Jan. 15, 1935

1,987,823

UNITED STATES PATENT OFFICE 1,987,823

SELF-STARTING SYNCHRONOUS ELECTRIC MOTOR

Julius W. Hansen, Princeton, Ind., assignor to The E. Ingraham Company, Bristol, Conn., a corporation Application February 6, 1934, Serial No. 709,919

4 Claims. (Cl. 172—275)

This invention relates to an improvement in self-starting synchronous electric motors and particularly to small or miniature size motors of the type referred to and primarily designed for use in clocks and other time instruments, though not so limited.

One of the main difficulties in the design and manufacture of self-starting synchronous electric motors is to obtain a proper balance between so-called "self-starting" torque and so-called "synchronous" torque to insure self-starting on the one hand and to guard, on the other hand, against the self-starting torque causing the over-speeding of the rotor, i. e., operating at speeds above synchronous speed.

Many factors contribute to the difficulties above referred to, such, for instance, as variations in flux density, permeability and retentivity of the rotor, etc., and what is most troublesome as a manufacturing problem, the critical size of the gaps, especially that between the field structure and the rotor.

One of the objects of the present invention is to provide a superior self-starting synchronous electric motor which may be economically manufactured by mass-production methods.

Another object is to provide a reliable motor of the type referred to in which the size of the gap between the rotor and field-poles, as well as the factor of field-strength, etc., are not of an unduly critical nature.

A further object is to provide a motor of the class described having superior torque, despite a relatively-light rotor-unit, which latter it is desirable to employ to minimize wear.

Other objects and advantages will appear to those skilled in the art from the following, considered in conjunction with the accompanying drawing and the appended claims.

In the accompanying drawing:

Fig. 1 is a face view of one form which a synchronous electric motor embodying the present invention may assume;

Fig. 2 is a perspective view of the rotor-unit thereof; and

Fig. 3 is a diametrical sectional view thereof, showing also a portion of a pole of the stator.

The particular synchronous motor herein chosen for the illustration of the present invention includes a stator-structure having two complementary pairs of pole-pieces 10—11 and 12—13. The pair of pole-pieces 10 and 11 are interconnected at their outer ends by a core-piece 14 mounting a usual magnet-coil 15.

Similarly, the outer ends of the pole-pieces 12 and 13 are interconnected at their respective outer ends by a corresponding core-piece 16 mounting a magnet-coil 17 corresponding to the magnet-coil 15 just above referred to.

Each of the pole-pieces 10, 11, 12 and 13 is bifurcated or notched at its inner end as at 18 to provide complementary polar-projections 19 and 20, the former being unshaded, while the latter is provided with a usual laminated shading-coil 21 to cause a time-lag in the magnetic-flux in the polar-projection 20 to thus produce a rotating magnetic-field effect.

The inner faces of the polar-projections 19 and 20 of each of the four pole-pieces are symmetrically-concaved about the center of a shaft 22 located centrally of the structure and projecting from a suitable supporting-member or gear-box 23, to which also the pole-pieces 10, 11, 12 and 13 are secured by means of studs 24 and nuts 25. Preferably, the notches 18 in the pole-pieces are wider than the gaps between the adjacent pole-pieces 10, 11, 12 and 13, so that two polar-projections of opposite instantaneous-polarity lie closer together than do the polar-projections of like instantaneous-polarity.

Concentrically mounted within the space enclosed by the pole-pieces 10, 11, 12 and 13 is a rotor-unit including a collet 26 staked upon or otherwise secured to the shaft 22 and having staked at its respective opposite ends a pair of corresponding rotor-members 27 and 28 formed of magnetic material and preferably of high-carbon steel. Each of the said rotor-members 27 and 28 is skeletonized to provide eight (more or less) substantially-radial arms 29, each of which terminates at its outer end in a circumferentially-offsetting finger or hook 30, the offsetting-finger 30 of one arm projecting into a position closely adjacent the trailing edge of an adjacent arm, being separated therefrom by a relatively-slight gap 31.

By reference to Figs. 1 and 2 particularly, it will be noted that the rotor-members 27 and 28 are circumferentially displaced with respect to each other, so that the gaps 31 in one of the said members is "overlapped," so to speak, by the adjacent rotor-member. It will also be noted that the said gaps 31 are of but minor pitch-width as compared to the pitch-width of the peripheral portion of each radial arm 29 and its offsetting-finger 30, each of which latter is of sufficient pitch-width to overlap two of the immediately-adjacent polar-projections 19 and 20.

When alternating current is supplied to the magnet-coils 15 and 17, alternating magnetic flux will be set up in the stator-structure, and owing to the shading-coils 21, a rotating torque will be developed to start the rotor-unit and bring the same up to synchronous speed, which in the instant structure is 1800 R. P. M. when a 60-cycle alternating current is employed. The relative polarities of the various polar-projections are for convenience indicated in Fig. 1 as for a given instant.

Should a certain number of motors constructed in accordance with the present invention by mass-production methods prove unsatisfactory, owing to various factors, such, for instance, as variations in the magnetizing coils, faulty spacing of the parts of the stator structure, etc., a slight change in the relative displacement between the skeletonized rotor-members will ordinarily suffice to correct such defects.

By means of the particular shaping and relative displacement of the extensions of the respective rotor-members 27 and 28, a very reliable self-starting effect is secured without, however, creating any effective tendency for the rotor to operate at speeds above its predetermined synchronous speed.

The invention may be carried out in other specific ways than that herein set forth without departing from the spirit and essential characteristics of the invention, and the present embodiment is, therefore, to be considered in all respects as illustrative and not restrictive, and all changes coming within the meaning and equivalency range of the appended claims are intended to be embraced therein.

I claim:

1. A self-starting synchronous electric motor, including in combination: an electromagnetic stator having a plurality of polar-projections, certain of which are shaded to produce a rotating-field effect; a rotor-unit mounted in the magnetic field of the said stator and including two axially spaced-apart skeletonized rotor-members, each having a plurality of substantially-radial arms terminating in circumferentially-offsetting portion spaced from an adjoining arm by a gap, the peripheral extent of each of said arms, together with its circumferentially-offsetting portion, being materially greater than the pitch-width of the polar-projections of the said stator; the said rotor-members being circumferentially-displaced with respect to each other to bring a portion of the circumferentially-offsetting portions of the radial arms of one thereof into overlapping relationship with respect to the gaps between the arms of the other of the said rotor-members.

2. A self-starting synchronous electric motor, including in combination: an electromagnetic stator having a plurality of polar-projections, certain of which are shaded to produce a rotating-field effect; a rotor-unit mounted in the magnetic field of the said stator and including two axially spaced-apart skeletonized rotor-members, each having a plurality of substantially-L-shaped arms spaced from adjoining arms by a gap, the peripheral extent of each of the said substantially-L-shaped arms being materially greater than the pitch-width of the polar-projections of the said stator; the said rotor-members being circumferentially-displaced with respect to each other to bring a portion of the L-shaped arms of one thereof into overlapping relationship with respect to the gaps between the arms of the other of said rotor-members.

3. A self-starting synchronous electric motor including in combination: an electromagnetic stator having a plurality of pole-pieces each notched to produce two complementary polar-projections, one of which is shaded to produce a rotating-field effect and spaced from its complementary unshaded polar-projection by a gap exceeding its own pitch-width; a rotor-unit mounted in the magnetic field of the said stator and including two spaced-apart skeletonized rotor-members, each having a plurality of substantially-radial arms terminating in circumferentially-offsetting portions spaced from an adjoining arm by a gap; the said rotor-members being circumferentially-displaced with respect to each other to bring a portion of the circumferentially-offsetting portions of the radial arms of one thereof into overlapping relationship with respect to the gaps between the arms of the other of the said rotor-members.

4. A self-starting synchronous electric motor including in combination: an electromagnetic stator having a plurality of pole-pieces notched to produce two complementary polar-projections, one of which is shaded to produce a rotating-field effect and spaced from its complementary unshaded polar-projection by a gap exceeding its own pitch-width; a rotor-unit mounted in the magnetic field of the said stator and including two spaced-apart skeletonized rotor-members, each having a plurality of substantially-L-shaped arms spaced from adjoining arms by a gap; the said rotor-members being circumferentially-displaced with respect to each other to bring a portion of the L-shaped arms of one thereof into overlapping relationship with respect to the gaps between the arms of the other of said rotor-members.

JULIUS W. HANSEN.